United States Patent
Hood

(10) Patent No.: US 8,522,118 B2
(45) Date of Patent: Aug. 27, 2013

(54) ERROR HANDLING IN A PASSIVE OPTICAL NETWORK

(75) Inventor: David Hood, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 233 days.

(21) Appl. No.: 13/076,377

(22) Filed: Mar. 30, 2011

(65) Prior Publication Data

US 2012/0254651 A1    Oct. 4, 2012

(51) Int. Cl.
*H03M 13/00* (2006.01)

(52) U.S. Cl.
USPC .............................. 714/779; 398/33; 398/38

(58) Field of Classification Search
USPC ........................................ 714/779; 398/38
See application file for complete search history.

(56) References Cited

U.S. PATENT DOCUMENTS

2006/0072538 A1   4/2006   Raith
2010/0098413 A1*  4/2010   Li et al. ................... 398/38

FOREIGN PATENT DOCUMENTS

EP         1 755 248 A1     2/2007
WO    WO 2010/142853 A1    12/2010

OTHER PUBLICATIONS

"3av_0811_anslow_1; 3av_0811_anslow_1", IEEE Draft; 3AV_0811_ANSLOW_1, IEEE-SA, Piscataway, NJ USA. vol. 802.3, Oct. 7, 2008. pp. 1-17, XP017634469.
ITU-T G.987 : 10-Gigabit-capable passive optical network (XG-PON) systems: Definitions, abbreviations and acronyms, Series G: Transmission Systems and Media,Digital Systems and Networks, Jun. 2012, the whole document.

* cited by examiner

*Primary Examiner* — Sam Rizk

(57) ABSTRACT

When data containing an unrecoverable error is received, instead of discarding the data, a lower protocol layer delivers the data to a higher protocol layer along with an indication that the data contains an error. The higher protocol layer parses the data to recover portions that are not affected by the error. Additionally, the higher protocol layer can choose to accept the data if certain acceptance criteria are met.

26 Claims, 7 Drawing Sheets

ERROR HANDLING IN A PASSIVE OPTICAL NETWORK

BACKGROUND

The present invention relates generally to error detection in a communications network and, more particularly, to a method and apparatus for signaling error events between layers of a layered protocol stack.

The Gigabit Passive Optical Network (G-PON) uses a layered protocol stack to implement the communication protocols. Each layer of the protocol stack represents a set of protocols or processes needed for communication between the network nodes. These protocols or processes are typically implemented by hardware or firmware, with exceptions typically handled by firmware or software. The organization of the protocols into a layered protocol stack enables modifications in one layer without affecting the applications in other layers.

When data is sent from one node to another, it is passed down through the layers of the protocol stack at the originating node, transmitted over the physical medium to the destination node, and passed back up the protocol stack at the destination node. As the data travels down the protocol stack at the originating node, each layer adds a header containing information used by the protocols at that layer. As the data travels up the protocol stack at the destination node, the header information is stripped off at each layer.

It is typical for one or more layers of the protocol stack to implement an error detection and/or error correction capability. Error detection and/or correction is implemented by embedding redundant information in the data that is transmitted by the particular protocol layer. The redundant information enables the detection and/or correction of errors at the receiver. If an uncorrectable error is detected, the general practice is to silently discard the data containing the error without any notification to the higher layer protocols. For some applications, a retransmission protocol may be implemented at a higher protocol level to repeat a previously-transmitted request or to request retransmission of missing data.

The typical practice of silently discarding data packets by lower protocol layers and using retransmission protocols at the higher protocol layers has several drawbacks. First, retransmission is not useful for many real-time applications in which timeliness is as important as correctness. Second, for non real-time applications, additional delay is introduced by requiring the higher protocol layer to wait for expiration of a timer before initiating the retransmission. Third, some of the discarded data may still be useful to the higher protocol layer. Discarding such means that system throughput will be reduced by unnecessary retransmissions. Fourth, the loss of part of a structured data stream may cause loss of synchronization, leading to further losses in portions of the data stream that contain no errors, but whose structure cannot be deduced until the receiving device regains synchronization.

Accordingly, there is a need for new techniques to prevent or mitigate data loss when unrecoverable data errors occur.

SUMMARY

The present invention provides methods and apparatus for processing data that contains unrecoverable errors. Instead of discarding the data when an uncorrectable error occurs, a lower protocol layer delivers the data to a higher protocol layer and provides an indication that the data contains an uncorrected error. The higher protocol layer can parse the data to recover portions that are not affected by the error. For example, the higher protocol layer can parse the data to recover one or more data frames having valid frame headers. As another example, the higher layer protocol can parse the received data to recover a control message protected by a higher layer protocol check code. The check code can be used to validate the control message if the control message itself is not affected by the error. In another aspect of the invention, a control message with an invalid check code can be accepted if certain acceptance criteria are met, whether or not the lower layer indicates the presence of uncorrectable errors.

Exemplary embodiments of the present invention comprise methods implemented in a network node of a passive optical network for processing data containing unrecoverable errors. In one exemplary method, a first protocol layer receives data containing one or more uncorrected errors and delivers the data to a second protocol layer with an error indication. The second protocol layer parses the received data responsive to the error indication to recover a portion of the received data unaffected by the error(s). In some embodiments of the invention, the data comprises multiple data frames and the data is parsed to recover one or more data frames with valid frame headers. In some embodiments of the invention, the data is parsed to recover a message protected by a check code.

Other embodiments of the invention comprise a network node in a passive optical network. In one exemplary embodiment, the network node comprises a receiver front end to receive data over a passive optical network and a processing circuit to process the received data. The processing circuit comprises a first processor to implement a first set of protocols and a second processor to implement a second set of protocols. The first processor is configured to provide an error indication indicating that the received data has one or more uncorrected errors. The second processor is configured to parse the received data responsive to the error indication to recover a portion of the received data that is unaffected by the error.

The present invention enables data to be recovered that might otherwise be lost due to uncorrectable errors.

DETAILED DESCRIPTION

Figure 1:
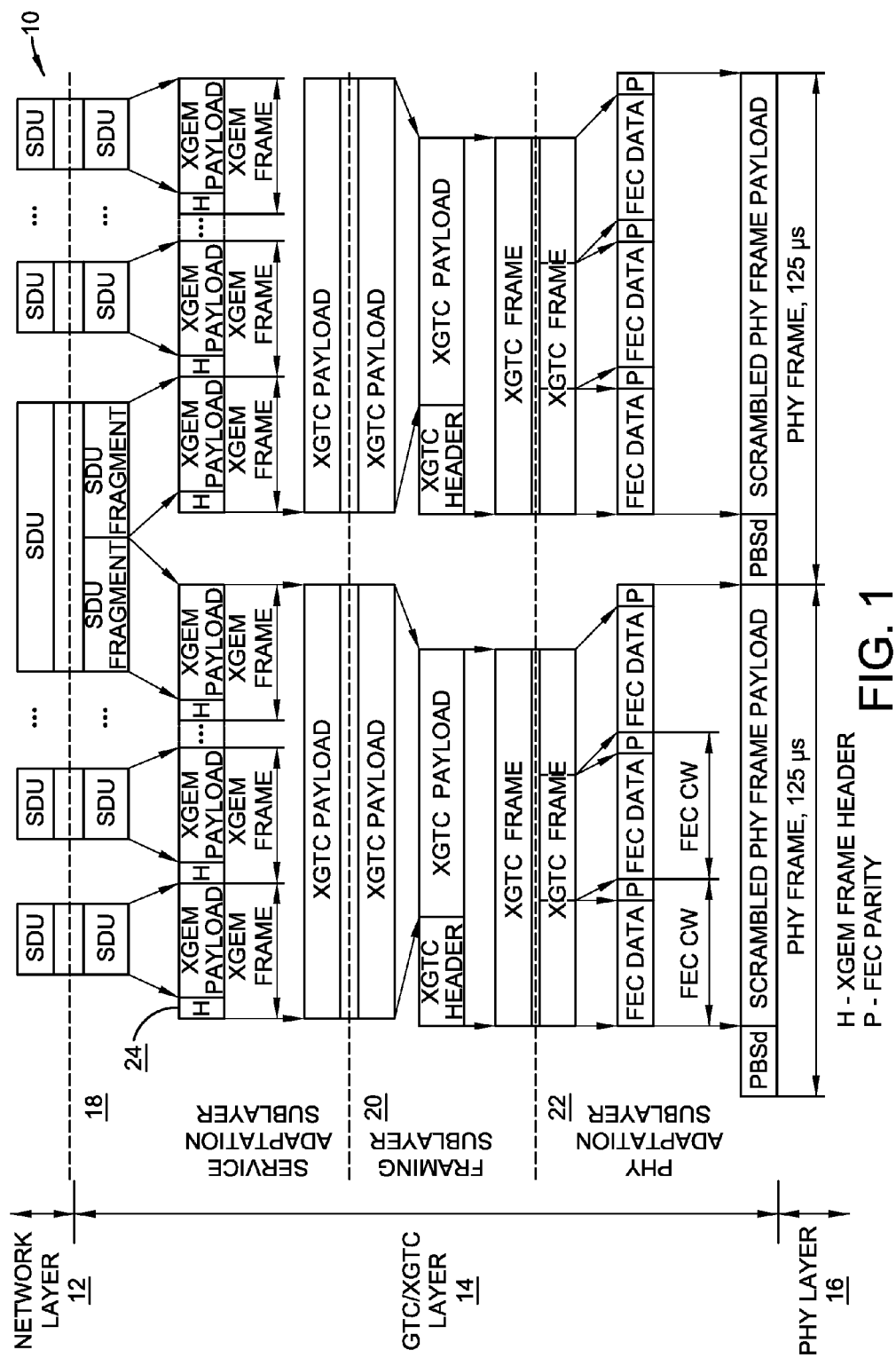
FIG. 1 illustrates an exemplary protocol stack for a passive optical network.

Referring now to the drawings, FIG. 1 illustrates an exemplary protocol stack 10 for an Gigabit Passive Optical Network (G-PON or X-GPON). The G-PON network is described by the International Telecommunication Union (ITU) in the G.984.3 specification. The XG-PON network is described by the International Telecommunication Union (ITU) in the G.987.3 specification. The protocol stack for both G.987.3 and G.984.3 networks is essentially the same (distinguished by the prefix X in G.987, the distinction not being essential for purposes of this description) and includes three main layers: the network layer 12, G-PON/XG-PON Transmission Convergence (GTC/XGTC) layer 14, and the physical layer 16. The network layer 12 implements a networking protocol such as the Ethernet, Internet Protocol (IP), or Multiprotocol Label Switching (MPLS). On the transmitter side, the network layer 12 generates data packets, referred to herein as service data units (SDUs), for transmission and delivers the SDUs to the GTC/XGTC layer 14. On the receiver side, the network layer 12 receives the SDUs from the GTC layer 14.

The GTC layer 14 comprises three main sublayers: the service adaptation sublayer 18, the framing sublayer 20, and the physical adaptation sublayer 22. On the transmitter side, the GTC service adaptation sublayer 18 accepts the upper layer SDUs and applies the G-PON encapsulation method (GEM) to obtain GEM/XGEM frames. The GEM header 24 of each GEM frame includes a length indicator (LI) information element to indicate the length of the GEM frame. The GEM frame header 24 also includes redundant information that permits detecting and/or correcting errors within the header 24 itself. A series of GEM frames forms a payload of a GTC frame in the downstream direction or a GTC burst in the upstream direction. On the receiver side, the GTC service adaptation layer 18 accepts the payload of the GTC frames, decapsulates the GEM frames, and reassembles the SDUs for delivery to the network layer 12.

The GTC framing sublayer 20 is responsible for adding and parsing headers to the GTC payload to support the PON management functions. The GTC header contains zero or more physical layer operations and maintenance (PLOAM) messages, which are used for low-level control communications between the nodes. On the transmit side, a header is added to the GTC payload to form a GTC frame (downstream) or GTC burst (upstream). On the receiver side, the GTC framing sublayer 20 accepts the GTC frames or GTC bursts from the physical adaptation sublayer 22, parses the GTC header to extract the PLOAM messages contained therein, and delivers the GTC payload to the service adaptation sublayer 18. The incoming PLOAM messaging channel flow is delivered to the PLOAM processing engine (not shown).

The physical adaptation sublayer 22 is responsible for generating a bit stream suitable for transmission over the transmission medium. The functions performed at the physical adaptation sublayer 22 include physical layer error detection and correction. On the transmitter side, the physical adaptation sublayer 22 accepts the GTC frame (downstream direction) or GTC burst (upstream direction) from the GTC framing sublayer 20, partitions the GTC frames into FEC data blocks, and computes and appends the FEC parity field to each FEC data block to generate a FEC codeword. Several FEC codewords are concatenated to form a payload for the physical layer frames, which are transmitted over the physical medium. The bits of the physical layer frame payload are scrambled to increase robustness against repeated identical bits and a header including synchronization information is added to the payload to create the physical layer frame or physical layer burst. On the receiver side, the physical adaptation sublayer 22 receives data transmitted over the physical medium, performs synchronization and descrambles the physical layer frames, decodes the FEC codewords to detect and correct errors within its capabilities, and reassembles the GTC frames or GTC bursts. If no errors occur during transmission, the GTC frames or GTC bursts are delivered to the framing sublayer 20. If an uncorrectable error occurs in a GTC frame or burst, the remainder of the GTC frame or burst is in current implementations discarded by the FEC decoder. In this case, a retransmission protocol implemented at a higher layer may request retransmission of the discarded data or take other steps to mitigate the loss of data. The discarding of a partial or compete GTC frame or burst is referred to herein as an erasure.

The physical layer 16 comprises the physical medium over which the data is transmitted.

In current implementations of the protocol stack 10, an erasure by the physical adaptation sublayer 22 due to an unrecoverable error is not signaled to the higher layers. Instead, the data containing the error is silently discarded. In the particular case of a GTC frame or burst, the discarded data includes not only the FEC data block containing the error, but all subsequent FEC data blocks that are part of the same GTC frame or burst. To recover from error events, a protocol may be implemented at a higher protocol layer for non-real time data to request retransmission of any data that is discarded at a lower layer. Typically, the higher layer protocol sets a timer when a missing data packet is detected. If the missing packet is not received before the timer expires, the higher layer protocol can request retransmission of the missing data packet. One problem with this approach is that the wait period before requesting retransmission of missing data packets increases the latency of the data transmission. For real time data, the lost data typically cannot be recovered in time to be useful.

According to exemplary embodiments of the present invention, a mechanism is provided to enable a lower protocol layer to signal an error event to a higher protocol layer. The term "layer" is used in this context in its broadest sense, to include sublayers. In response to the error indication, the higher protocol layer can use knowledge about the structure of the data to recover a portion of the data that is not affected by the error. Thus, at least some of the data that would otherwise be discarded can be saved.

Figure 2:
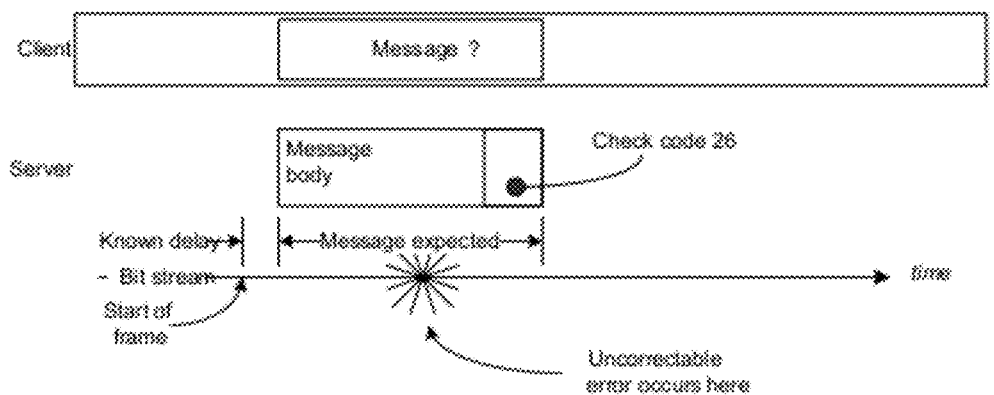
FIG. 2 illustrates a data transmission error detected by a server layer affecting a message received by a client layer.

FIG. 2 illustrates an application of the present invention to the transmission of PLOAM messages as specified by the International Telecommunication Union (ITU) in the G.987.3 and G.984.3 specifications. The PLOAM message is exchanged between an optical line terminal (OLT) and optical network unit (ONU). Each PLOAM message is protected by a check code 26, such as an error-detecting and -correcting cyclic redundancy check code (CRC) for G.984.3 systems and a cryptographically-derived message integrity check (MIC) code for G.987.3 systems, which detects message alterations. In current implementations PLOAM messages with invalid check codes are silently discarded.

The PLOAM channel in G-PON networks is message based and is carried in a designated field of the GTC frame header (downstream) and the GTC burst header (upstream). In the event that an FEC codeword contains an uncorrectable error, the current practice is to discard the entire GTC frame/burst, which may include one or more PLOAM messages. In contrast, embodiments of the present invention use knowledge of the frame and header structure to recover PLOAM messages that would otherwise be discarded when an unrecoverable error is detected in an FEC codeword. As long as frame synchronization is maintained, the receiving node can determine the location of PLOAM messages in the data stream. More particularly, flags or counters at specific locations in the data stream indicate the presence of one or more PLOAM messages. Assuming these flags or counters are received without error, the receiving node can extract the PLOAM messages from the data stream, possibly containing embedded uncorrected errors. The PLOAM message can then be verified by its check code 26. If after a possible error correction step the check code is valid, the PLOAM message can be assumed to be valid.

In the prior art, a PLOAM message containing an invalid check code (e.g. CRC or MIC) is silently discarded. According to another aspect the present invention, it may be appropriate to accept the PLOAM message even with an invalid check code. For example, if the message comprises an emergency stop message, the PLOAM application may accept the message. Other criteria may also be taken into account before deciding whether to discard the PLOAM message. For example, G.987.3 requires a PLOAM message to contain an incrementing and therefore predictable message sequence number, which may be used as additional validation. If the sequence number is correct, the PLOAM application may accept the message despite the error. Also, the PLOAM application may evaluate the consequences of accepting the message. A PLOAM message deemed to be harmless may be accepted despite the error. As an example, a request to read back data from the device may be accepted.

Figure 3:
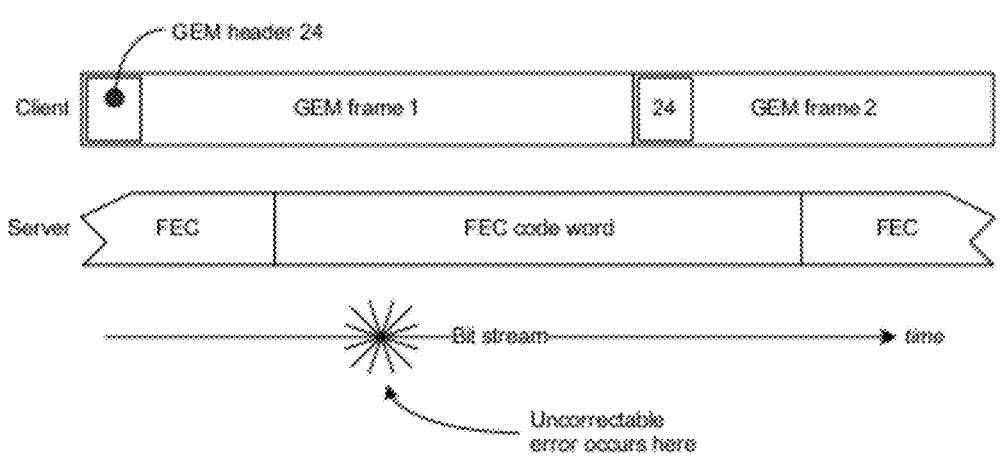
FIG. 3 illustrates a data transmission error detected by a server layer affecting two or more data frames at a client layer.

FIG. 3 illustrates another application of the present invention to avoid error propagation that could otherwise occur when data is discarded and synchronization is lost. Error propagation occurs when a data error in a lower layer frame results in the loss of two or more higher layer frames. FIG. 3 illustrates an unrecoverable error in an FEC codeword received at the physical adaptation sublayer 22. FEC codewords typically comprise not more than 255 bytes (XG-PON FEC codewords are 248 bytes), while Ethernet frame SDUs are often 500 or more bytes long, and not infrequently as much as 1500 bytes. An uncorrectable FEC codeword that falls into the middle of a GEM frame may cause no damage whatever to the synchronization mechanism, which uses the frame length indicator field of the GEM header 24. However, if the uncorrectable errors span a GEM header, the synchronization mechanism is lost. Because the location of the uncorrectable error is not exploited by current implementations, the typical practice as specified by the ITU recommendations is to discard the remainder of the frame/burst following the uncorrectable FEC codeword. Thus, an FEC error affecting one GEM frame can lead to further data losses because the synchronization information in the header of the GEM frame is not used, even though it might have been valid.

According to one embodiment of the present invention, rather than being discarded, the GTC frame containing the uncorrectable FEC codeword is delivered by the physical adaptation sublayer 22 to the framing sublayer 20, along with an indication that the GTC frame contains an error within a specific range of byte locations. The framing sublayer 20 passes the GTC payload to the service adaptation sublayer, along with the error information that the GTC payload includes an error within a specific range of byte locations. In the example shown in FIG. 3, it is presumed that the data error occurs in the payload of GEM frame 1 and that the GEM headers 24 of both GEM frames 1 and 2 are received error free. While there is no way to avoid the loss of GEM frame 1, the length indicator contained in the GEM header 24 of GEM frame 1 allows the service adaptation sublayer 18 to determine the starting point of GEM frame 2. By using data that would otherwise have been discarded, the service adaptation sublayer 16 can avoid the loss of GEM frame 2 and subsequent GEM frames.

Figure 4:
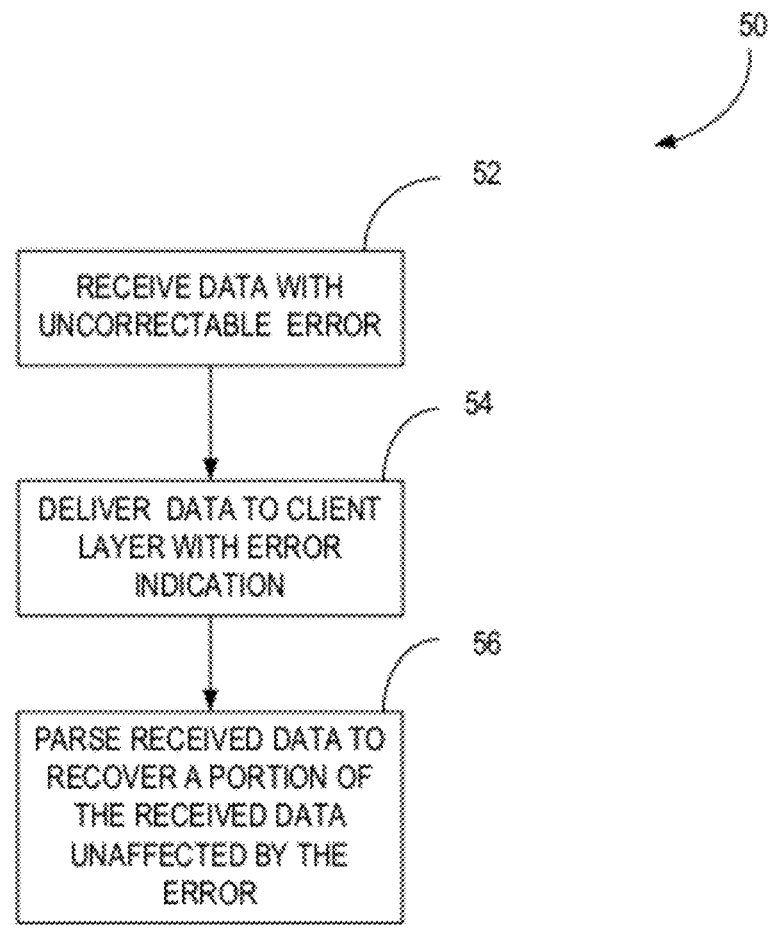
FIG. 4 illustrates an exemplary method of receiving data having an uncorrectable error and parsing the received data to recover a portion unaffected by the error.

FIG. 4 illustrates an exemplary method 50 of receiving data containing unrecoverable data transmission errors. The method begins when a data block containing an uncorrectable error is received at a first protocol layer (e.g., PAS 22 or framing sublayer 20) (block 52). Rather than discard the received data, the first protocol layer delivers the data block to a second protocol layer (e.g. framing sublayer 20 or SAS 18) with an error indication (block 54). The second protocol layer may then parse the received data block responsive to the error indication to recover a portion of the received data stream that is unaffected by the error or errors (block 56). The second protocol layer may, for example, verify that a portion of the received data block is free of errors, parse the received data block to extract the error free portion, and use the error free portion. It should be appreciated that the second protocol layer is above the first protocol layer. However, other protocol layers may exist between the first and second protocol layers.

In one exemplary embodiment, the received data comprises multiple data frames. The second protocol layer parses the received data to recover data frames having frame headers 24 that are free from errors. As one example, the received data may comprise a GTC frame containing two or more GEM frames. The GTC frame is received in one or more FEC codewords. An error in the FEC codeword can be detected by a decoder and an error indication can be provided to the service adaptation sublayer 18 and/or framing sublayer 20.

In another exemplary embodiment, the received data contains a control message with a check code. The second protocol layer parses the received data to recover the control message and verifies that the control message after possible error correction contains a valid check code. If the check code is valid, it is presumed that the control message is not affected by the error and the control message can be used.

Figure 5:
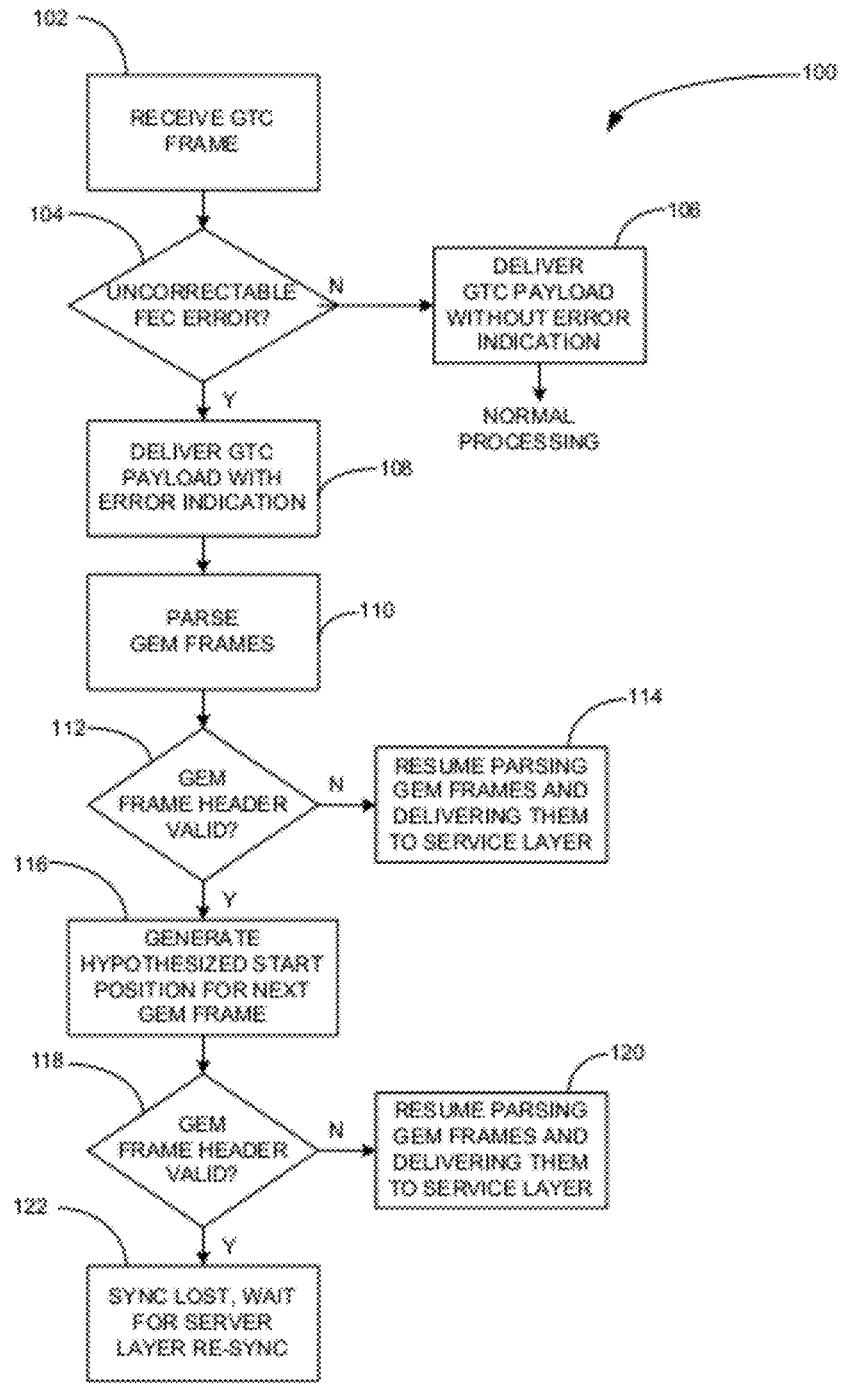
FIG. 5 illustrates an exemplary method for parsing data to recover data frames having valid frame headers.

FIG. 5 illustrates an exemplary method 100 according to one embodiment of the invention. In this embodiment, the physical adaptation sublayer (PAS) receives data over the physical medium (block 102). The data is protected by a forward error correction (FEC) code. The physical adaptation sublayer 18 decodes the received data and checks for uncorrected errors (block 104). If the data has no uncorrected errors, the PAS 22 delivers the data to the framing sublayer (FS) 20, which in turn delivers the data to the service adaptation sublayer (SAS) 18 (block 106). The service adaptation sublayer 18 processes the data normally. If the received data includes a block that contains an uncorrectable error, rather than discard the block, the physical adaptation sublayer 22 delivers the data block to the framing sublayer 20 (block 108) together with an indication that the particular data block contains an uncorrectable error. More particularly, the received data is assembled into one or more GTC frames or bursts and delivered to the framing sublayer 20 along with the error indication. The framing sublayer 20 in turn delivers the data to the service adaptation sublayer 18 retaining the error indication. The service adaptation sublayer 18 parses the GEM frame headers 24 and determines whether the GEM frame headers contain any errors (block 110, 112). If the GEM frame headers are error free, the service adaptation sublayer 18 continues parsing the GEM frame headers (block 114). However, if an error is detected in a GEM frame header, the service adaptation sublayer 18 generates a hypothesis about the start position of the next GEM frame (block 116). As one example, the service adaptation sublayer 18 may use the frame length indicator in the GEM frame header on the assumption that the frame length indicator is unaffected by the error. Using the hypothesized or estimated start position, the service adaptation sublayer 18 parses the next header and checks the hypothetical next GEM header 24 for errors (block 118). If no errors are detected, the service adaptation sublayer 18 continues parsing headers as previously described (block 120). If an error is detected in the hypothetical next GEM header 24, it is presumed that synchronization has been lost and the service adaptation sublayer waits for resynchronization by the framing sublayer (block 122).

Figure 6:
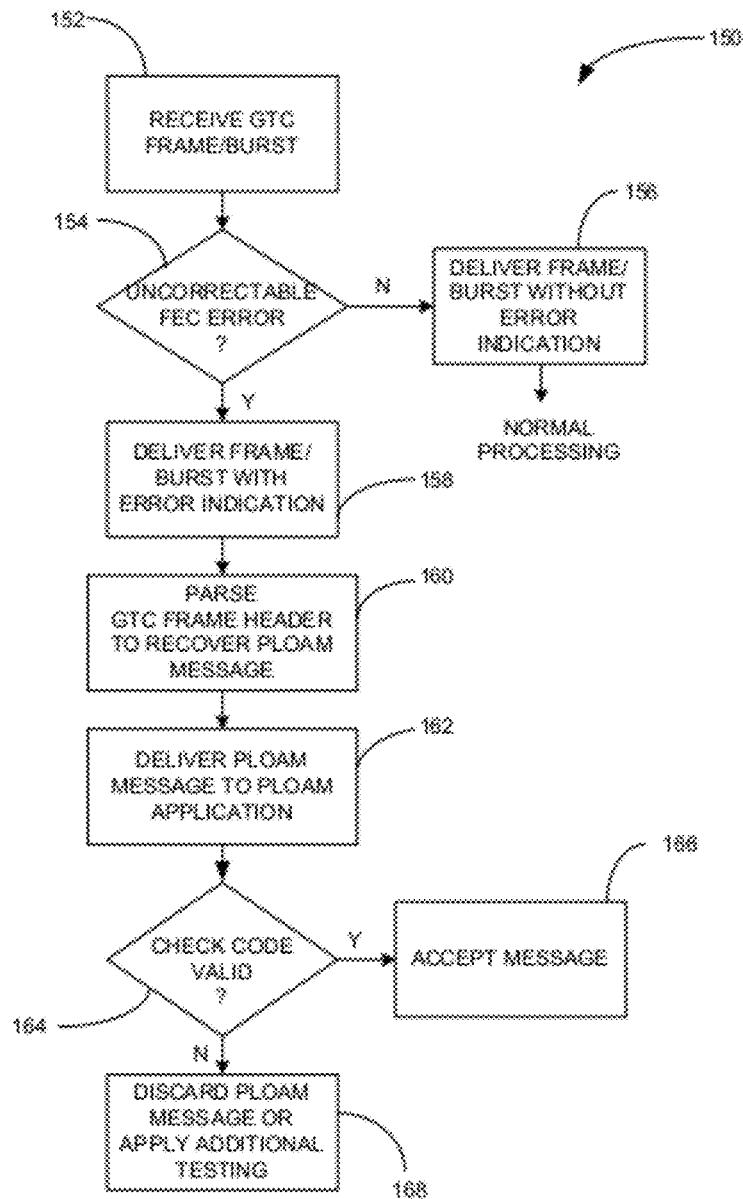
FIG. 6 illustrates an exemplary method for parsing data to recover a control message not affected by the error.

FIG. 6 illustrates an exemplary procedure 150 for recovering PLOAM messages when an uncorrectable error is detected at the physical adaptation sublayer 22. The physical adaptation sublayer 22 receives data protected by a forward error correcting code as previously described (block 152). Each FEC block in the received data is decoded and checked for errors (block 154). If no uncorrected errors occur, the data is assembled into GTC frames and delivered to the framing sublayer for normal processing (block 156). If a received FEC block contains an uncorrected error, rather than discard the remainder of the GTC frame, the physical adaptation sublayer delivers the GTC frame to the framing sublayer 20 with an error indication (block 158). The framing sublayer 20 parses the GTC frame header and extracts any PLOAM messages from the GTC frame header (block 160). The GTC payload may be discarded, or delivered to the service adaptation sublayer 18 with an error indication. The service adaptation sublayer 18 may then process the GTC payload as previously described in FIG. 5. The extracted PLOAM messages are delivered to the PLOAM client (block 162). After a possible error-correcting step, the PLOAM client can verify the PLOAM message using the MIC or CRC 26 appended to the PLOAM message (block 164). If the check code is valid, the message is accepted (block 166). If the check code is not valid, the PLOAM message may be discarded (block 168). Alternatively, additional testing may be applied to determine whether the PLOAM message can be accepted with an invalid check code.

Figure 7:
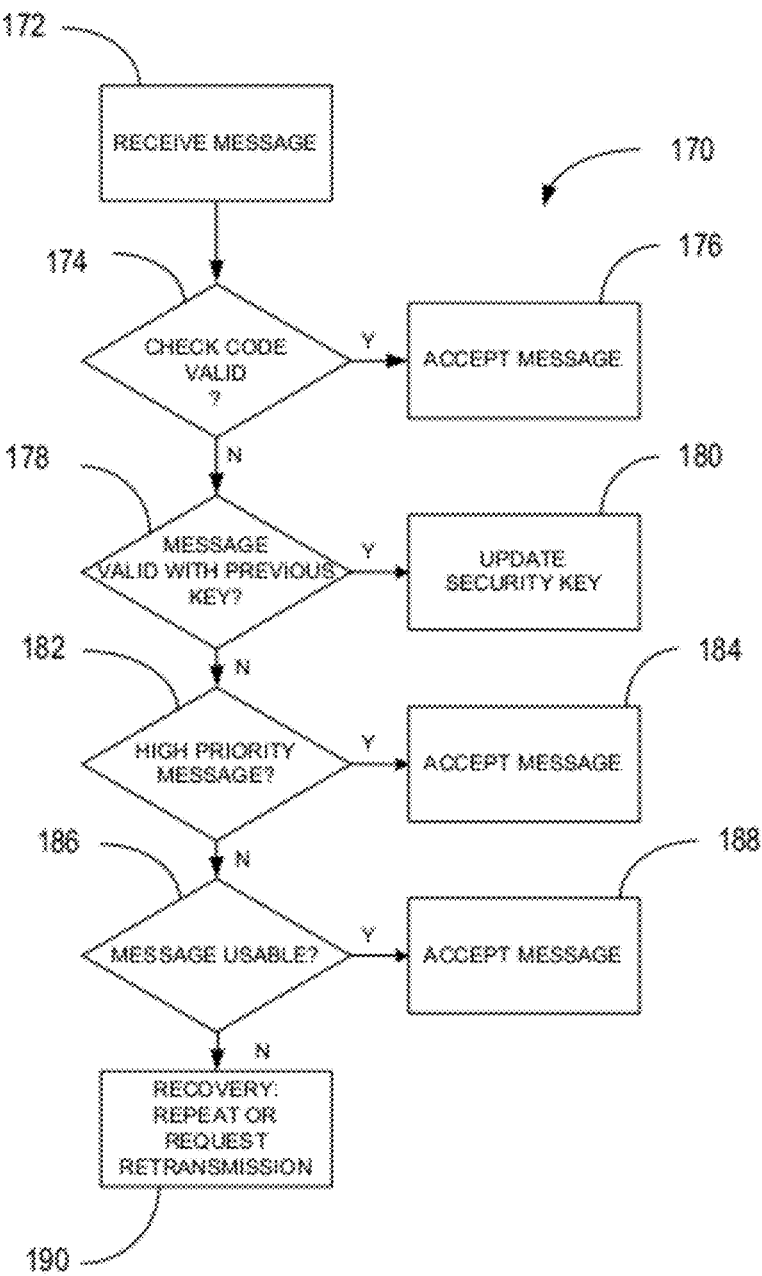
FIG. 7 illustrates an exemplary procedure for processing a control message with a check code that indicates uncorrectable errors in the message.

FIG. 7 illustrates an exemplary procedure 170 for processing a PLOAM message that contains a check code 26. The procedure begins when the PLOAM client receives a message containing a check code (block 172). The PLOAM client verifies the check code (block 174). If the check code is valid, the message is accepted (block 176). If the check code is not valid, rather than discard the message, the PLOAM client may apply additional acceptance criteria to determine whether to accept or reject the message (block 178, 182, 186). For the case where a PLOAM message is protected by an MIC code generated with a security key, the invalid check code 26 may be due to use of an unsynchronized or stale key. The PLOAM client may attempt to validate the PLOAM message with a previous security key (block 178). If the validation using the previous security key is successful, the PLOAM client can accept the message and initiate a security key update procedure to re-synchronize the security key (block 180). If the validation with the previous security key is not successful, the PLOAM client may determine a priority of the message (block 182). If the priority is above a threshold, the PLOAM client may accept the message (block 184). If the priority is below the threshold, the PLOAM client may determine whether the message is usable (block 186). A message may be considered usable if it contains errors that are deemed to be harmless. If the message is usable, the PLOAM client may accept the message (block 188). Other acceptance criteria can also be applied. If none of the acceptance criteria are satisfied, the PLOAM client may discard the message or take additional recovery steps (block 190). The additional recovery steps may comprise repeating a previously transmitted request, sending a negative acknowledgement or requesting retransmission from a peer PLOAM client. It will be appreciated that the method shown in FIG. 7 is applicable even in the absence of errors indicated by a server layer.

Figure 8:
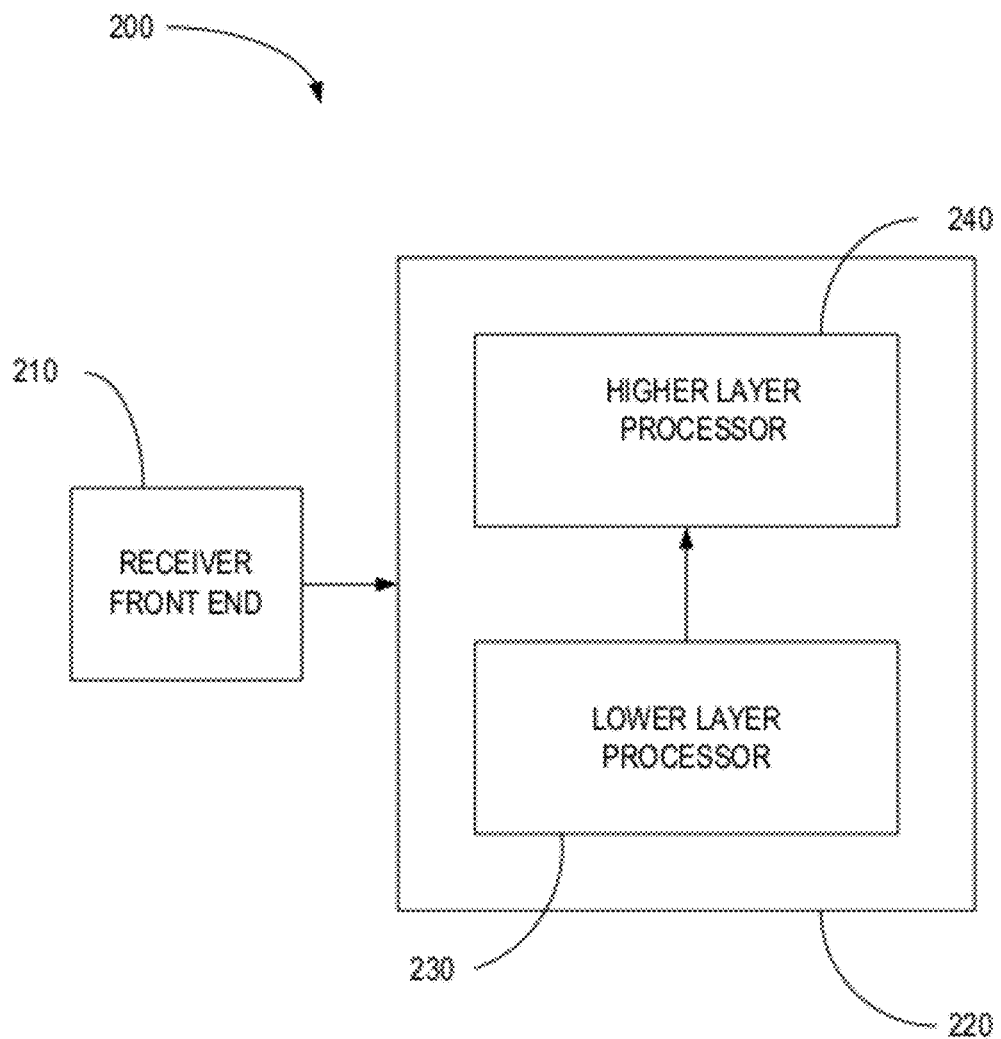
FIG. 8 illustrates an exemplary network node configured according to one embodiment of the present invention.

FIG. 8 illustrates an exemplary network node 200 according to one exemplary embodiment. The network node 200 comprises a receiver front end 210 to receive data over the passive optical network and a processing circuit 220 to process the received data. The receiver 210 may comprise any receiver capable of receiving data over a passive optical network. The received data is delivered to the processing circuit 220 for processing as herein described. The processing circuit 220 implements a layered protocol stack. The processing circuit 220 may comprise one or more microprocessors, hardware, firmware, or a combination thereof. The processing circuit 220 comprises a lower layer processor 230 for implementing lower layer protocols and a higher layer processor 240 to implement higher layer protocols. The same microprocessor, hardware, firmware, or combination thereof may be used to implement both the lower layer processor 230 and higher layer processor 240. Alternatively, different microprocessors, hardware, firmware, or a combination thereof may be used to implement the lower layer processor 230 and higher layer processor 240. The lower layer processor 230 and higher layer processor 240 are configured to execute the methods shown in FIGS. 4-7 respectively.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented in a node of a passive optical network for processing data containing uncorrected errors, said method comprising:
   receiving, by a first protocol layer, data containing one or more uncorrectable errors;
   delivering the data to a second protocol layer with an error indication, wherein the received data comprises part of two or more variable length data frames of a second protocol layer; and
   parsing, by the second protocol layer, the received data responsive to the error indication to recover a portion of the received data unaffected by the error(s), wherein said parsing comprises:
      determining a frame length of a first one of said data frames from a length indicator contained in a header of the first data frame; and
      determining the start position of a second data frame from the length indicator to recover the second data frame.

2. The method of claim 1 wherein the received data comprises a G-PON/XG-PON transmission convergence (GTC/XGTC) frame containing two or more G-PON/XG-PON encapsulation method (GEM/XGEM) frames.

3. A network node in a passive optical network, said node comprising:
   a receiver front end for receiving data over a passive optical network, wherein the received data comprises part of two or more variable length data frames of a second protocol layer;
   a processing circuit for processing received data, said processing circuit comprising:
      a first processor configured to provide an error indication indicating that received data has one or more uncorrected errors;

a second processor configured to parse, responsive to the error indication, the received data to recover a portion of the received data not affected by the error(s) by:
    determining a frame length of a first one of said data frames from a length indicator contained in a header of the first data frame; and
    determining the start position of a second data frame from the length indicator to recover the second data frame.

4. The network node of claim 3 wherein the received data comprises a G-PON/XG-PON transmission convergence (GTC/XGTC) frame containing two or more G-PON/XG-PON encapsulation method (GEM/XGEM) frames.

5. The network node of claim 3 wherein the check code is generated with a security key and wherein the second processor is configured to:
    validate the check code with a current security key;
    if the validation with the current security key is unsuccessful, validate the check code with a prior security key;
    if the validation with the prior security key is successful, initiate a security key update.

6. The network node of claim 3 wherein the second processor is further configured to accept the control message with an invalid check code if it is determined that the error is harmless.

7. The network node of claim 3 wherein the second processor is further configured to accept the control message with an invalid check code if the control message specifies a function regarded as high priority.

8. A method implemented in a node of a passive optical network for processing a message containing unrecoverable errors, said method comprising:
    receiving a message having a message check code;
    validating the check code;
    accepting the message if the check code is valid; and
    accepting the message with an invalid check code if a predetermined acceptance criterion is satisfied.

9. The method of claim 8 wherein the check code is generated with a security key and wherein validating the check code comprises validating the check code with a current security key.

10. The method of claim 9 wherein accepting the message with an invalid check code comprises:
    validating the check code with a prior security key;
    accepting the message if the validation with the prior security key is successful.

11. The method of claim 10 further comprising initiating a security key update if the validation with the prior security key is successful.

12. The method of claim 9 wherein accepting the message with an invalid check code comprises accepting the message if a priority of the message is a predetermined priority level.

13. The method of claim 8 wherein accepting the message with an invalid check code comprises accepting the message if it is determined that the error is harmless.

14. The method of claim 8 wherein the message comprises a physical layer, administration, and maintenance (PLOAM) message.

15. A network node in a passive optical network, said network node comprising:
    a receiver to receive data over a passive optical link;
    a processor configured to:
        receiving a message having a message check code;
        validating the check code;
        accepting the message if the check code is valid; and
        accepting the message with an invalid check code if a predetermined acceptance criterion is satisfied.

16. The network node of claim 15 wherein the check code is generated with a security key and wherein the processor is configured to validate the check code with a current security key.

17. The network node of claim 16 wherein the processor is configured to
    validate the check code with a prior security key if the validation with the current security key fails; and;
    accept the message if the validation with the prior security key is successful.

18. The network node of claim 17 wherein the processor is further configured to initiate a security key update if the validation with the prior security key is successful.

19. The network node of claim 15 wherein the processor is configured to accept the message if it is determined that the error is harmless.

20. The network node of claim 15 wherein the processor is configured to accept the message if a priority of the message is a predetermined priority level.

21. The network node of claim 15 wherein the message comprises a physical layer, administration, and maintenance (PLOAM) message.

22. A method implemented in a node of a passive optical network for processing data containing uncorrected errors, said method comprising:
    receiving, by a first protocol layer, data containing one or more uncorrectable errors;
    delivering the data to a second protocol layer with an error indication wherein the received data includes a control message protected by a check code; and
    parsing, by the second protocol layer, the received data responsive to the error indication to recover a portion of the received data unaffected by the error(s), wherein said parsing comprises:
        parsing the received data to recover the control message;
        validating the check code; and
        accepting the message if the check code is valid.

23. The method of claim 22 wherein the check code is generated with a security key and wherein validating the check code comprises:
    validating the check code with a current security key;
    if the validation with the current security key is unsuccessful, validating the check code with a prior security key;
    if the validation with the prior security key is successful, initiating a security key update.

24. The method of claim 22 further comprising accepting the control message with an invalid check code if it is determined that the error is harmless.

25. The method of claim 22 further comprising accepting the control message with an invalid check code if the control message specifies a function regarded as high priority.

26. A network node in a passive optical network, said node comprising:
    a receiver front end for receiving data over a passive optical network, wherein the received data comprises part of two or more variable length data frames of a second protocol layer;
    a processing circuit for processing received data, said processing circuit comprising:
        a first processor configured to provide an error indication indicating that received data has one or more uncorrected errors;
        a second processor configured to parse, responsive to the error indication, the received data to recover a portion of the received data not affected by the error(s) by:

determining a frame length of a first one of said data frames from a length indicator contained in a header of the first data frame; and determining the start position of a second data frame from the length indicator to recover the second data frame.

\* \* \* \* \*

UNITED STATES PATENT AND TRADEMARK OFFICE
CERTIFICATE OF CORRECTION

| | | |
|---|---|---|
| PATENT NO. | : 8,522,118 B2 | Page 1 of 1 |
| APPLICATION NO. | : 13/076377 | |
| DATED | : August 27, 2013 | |
| INVENTOR(S) | : Hood | |

It is certified that error appears in the above-identified patent and that said Letters Patent is hereby corrected as shown below:

In the Specification

In Column 4, Line 10, delete "compete" and insert -- complete --, therefor.

In the Claims

In Column 9, Line 57, in Claim 14, delete "physical layer, administration, and maintenance (PLOAM)" and insert -- physical layer operations and maintenance (PLOAM) --, therefor.

In Column 10, Line 6, in Claim 17, delete "configured to" and insert -- configured to: --, therefor.

In Column 10, Line 8, in Claim 17, delete "and;" and insert -- and --, therefor.

In Column 10, Lines 22-23, in Claim 21, delete "physical layer, administration, and maintenance (PLOAM)" and insert -- physical layer operations and maintenance (PLOAM) --, therefor.

Signed and Sealed this
Thirty-first Day of December, 2013

Margaret A. Focarino
*Commissioner for Patents of the United States Patent and Trademark Office*